United States Patent [19]

Toda

[11] Patent Number: 4,678,955
[45] Date of Patent: Jul. 7, 1987

[54] PIEZOELECTRIC POSITIONING DEVICE

[75] Inventor: Minoru Toda, Princeton Junction, N.J.

[73] Assignee: RCA Corporation, Princeton, N.J.

[21] Appl. No.: 853,751

[22] Filed: Apr. 18, 1986

[51] Int. Cl.⁴ ............................................. H01L 41/08
[52] U.S. Cl. ...................................................... 310/328
[58] Field of Search .......................... 310/328, 323, 317

[56] References Cited

U.S. PATENT DOCUMENTS

| | | | |
|---|---|---|---|
| 3,356,848 | 12/1967 | Heyck | 250/203 |
| 3,524,196 | 8/1970 | Church et al. | 310/328 |
| 3,835,338 | 9/1974 | Martin | 310/8.6 |
| 4,188,645 | 2/1980 | Ragle et al. | 360/75 |
| 4,394,061 | 7/1983 | Schroeder | 360/96.20 |
| 4,415,228 | 11/1983 | Stanley | 350/96.20 |
| 4,506,154 | 3/1985 | Scire | 310/328 |

FOREIGN PATENT DOCUMENTS 0082286 7/1978 Japan ................................... 310/328
0681479 8/1979 U.S.S.R. ............................. 310/328

OTHER PUBLICATIONS

"Precise Positioning with Piezoelectric Translators," reprinted from *Lasers & Applications,* Aug. 1983, pp. 61–63.
Catalog Physik Instrumente, The PI System.

*Primary Examiner*—Mark O. Budd
*Attorney, Agent, or Firm*—Joseph S. Tripoli; William Squire

[57] ABSTRACT

A relatively stiff piezoelectric translator comprises at least a pair of piezoelectric devices joined together at one end and secured to a fixed support at their other ends in orthogonal directions. Displacement of one device along its longitudinal axis displaces the other devices in a relatively weak direction transverse its longitudinal axis. Stiffness is enhanced by securing both ends of each device in the system.

6 Claims, 7 Drawing Figures

PIEZOELECTRIC POSITIONING DEVICE

This invention relates to piezoelectric positioning devices.

Piezoelectric positioning devices, or, as known, piezoelectric translators, are in wide use. These devices are used to provide linear movement with high resolution without backlash. They have the unique ability to convert electrical energy directly into mechanical displacements which provide relatively high efficiency, low energy consumption, rapid displacement, and relatively high force. The devices are backlash free since there are no hinge type joints or mechanical contact type joints, have no play, and do not cause additional vibrations and have extensive life capability.

A problem with prior art piezoelectric positioners is that the elements are usually connected end to end in chain-like fashion, each element extending in a different orthogonal direction. The extended end of the most cantilevered element tends to be weak in all directions. In some cases, the positioning portion of the system in a three orthogonal control device may be deformed by air turbulence, external vibrations, or low level forces which may be applied to the system, requiring extreme care in its use and operation. A need is present, therefore, for a relatively stiff piezoelectric device.

A relatively stiff piezoelectric positioning device according to the present invention comprises a first piezoelectric member having first and second opposing ends wherein one of said ends displaces relative to the other end in a given first direction parallel to an axis through the ends in response to an applied first control signal. A second piezoelectric member has third and fourth opposing ends wherein one of the third and fourth ends displaces relative to the other end in a given second direction parallel to an axis through the third and fourth ends in response to an applied second control signal. Means fixedly secure an end of each said member to the other at a common junction. A support secures the other ends of the members in fixed spaced relation with the first and second directions normal.

Figure 1:
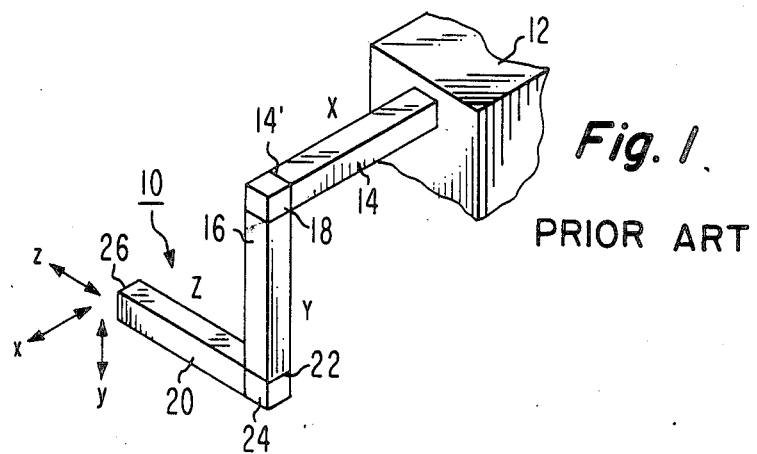
FIG. 1 is an isometric view of a prior art piezoelectric positioning device.

In FIG. 1, positioning device 10 (the prior art) comprises a support 12, a first piezoelectric element 14, which may be a stack of piezoelectric elements or a monolithic element, a second piezoelectric element 16 joined to an end 14' of element 14 by a connecting link 18, and a third piezoelectric element 20 connected to end 22 of element 16 with a second link 24. Element 14 displaces end 14' in the X directions in response to an applied control signal, element Y displaces an end thereof in the Y directions in response to an applied control signal, and element 20 displaces an end thereof in the Z directions in response to an applied control signal. These elements are connected serially in that the extended end of one element is coupled to an end of a second element and the extended end of that second element is coupled to an end of a third element. The cantilevered end 26 of element 20 is extremely weak in the transverse direction and is easily deformed by a weak external force, for example, several grams which may be air turbulence, external vibrations, or a pulling force of wires that may drape thereover.

Figure 2:
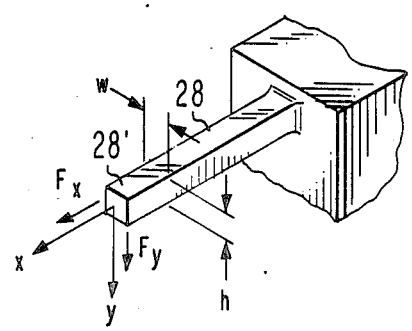
FIG. 2 is an isometric view of a piezoelectric device useful in explaining some of the principles of operation of such a device.

Generally, a cantilever is easily bent transversely but is not easily compressed in the longitudinal direction. This is described mathematically as follows. In FIG. 2, element 28 has a width w, a thickness h, and forces $F_x$ and $F_y$ of equal magnitude applied in respective X and Y directions. The shift of the extended end 28' of the element 28 in the transverse y direction due to a force $F_y$ is given by:

$$\Delta y = (4L^3/Ewh^3)F_y \quad (1)$$

and the shift of the extended end 28' of element 28 in the longitudinal X direction due to force $F_x$ is given by:

$$\Delta x = (L/Ewh)F_x \quad (2)$$

where L is the element length and E is Young's modulus. In one example, where $L=4''$, $w=\frac{1}{2}''$, $h=\frac{1}{2}''$, the ratio of $\Delta y$ to $\Delta x$ (for the equal force condition of $F_x=F_y$) is 256.

Figure 3:
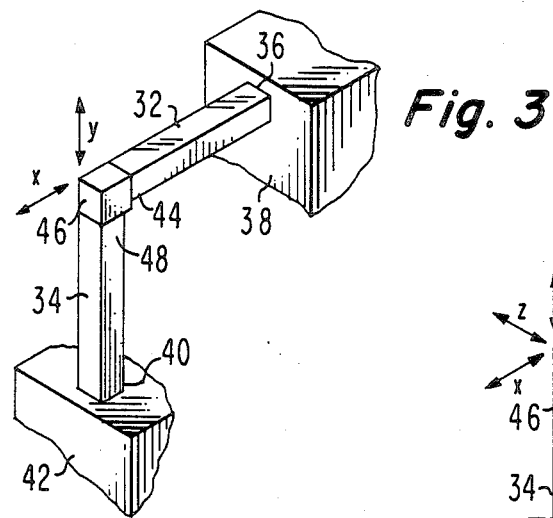
FIG. 3 is an isometric view of a first embodiment of the present invention.

The present invention provides a relatively stiff system which can provide the same kind of control as the system of FIGS. 1 and 2, but without the inherent weakness. In FIG. 3, device 30 comprises a first piezoelectric member 32 which may be a stack or a monolithic piezoelectric element and a second piezoelectric member 34 of similar construction. End 36 of member 32 is secured to a support 38. End 40 of member 34 is secured to a support 42. A cantilevered end 44 of member 32 is attached to the extended end 48 of member 34 by a joining member 46. End 44 displaces in the X directions relative to end 36 in response to a control signal applied thereto. Member 34 end 48 displaces in the Y directions relative to end 40 in response to an applied control voltage applied thereto. The joining member 46 is fixed to ends 44 and 48 so that the ends 44 and 48 move in unison in response to the movement of either of these ends.

When a control voltage is applied to member 32 so that end 44 thereof displaces in an X direction, member 46 also displaces in that X direction. Because member 34 is weak at its extended end in the X direction as explained above in connection with equations 1 and 2, end 48 readily displaces in response to the displacement of end 44. Similarly, when end 48 of member 34 is displaced in one of the Y directions, end 44 also displaces in the same Y direction because it is bent in its weak direction at this time. The joining of the end 44 and 48 to a common joining member 46 provides enhanced stiffness to the system not present in the system of FIG. 1.

Figure 4:
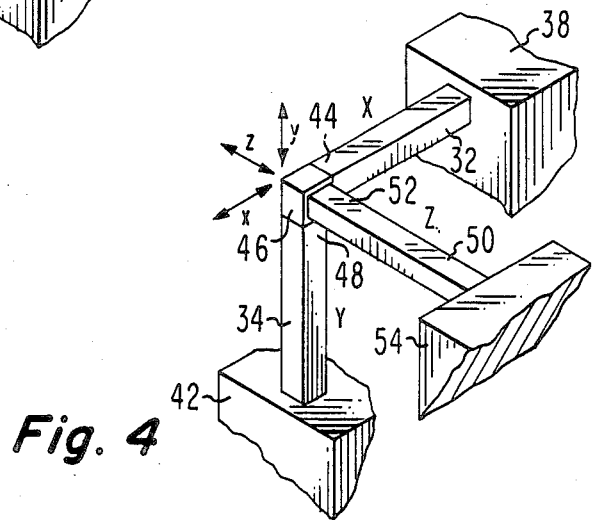
FIG. 4 is an isometric view of a second embodiment of the present invention.

In FIG. 4, a third member is added to the system of FIG. 3. In FIG. 4, an end of member 32 displaces in the X directions, an end of member 34 displaces in the Y directions and an end of piezoelectric member 50, connected to the joining member 46 at one end 52 and to a support 54 at its other end, displaces in the Z directions orthogonal to the X and Y directions. Because members 32 and 34 are both weak in the Z directions, displacement of the joining member 46 in the Z directions is easily accomplished with the piezoelectric member 50. The system of FIG. 4 is extremely stiff at joining member 46 because of the strut arrangement and the inherent stiffness of the piezoelectric members in their longitudinal directions. However, the joining member 46 is easily displaceable in the X, Y, and Z directions in response to an applied control signal applied to the corresponding X, Y, and Z piezoelectric drive members.

Figure 7:
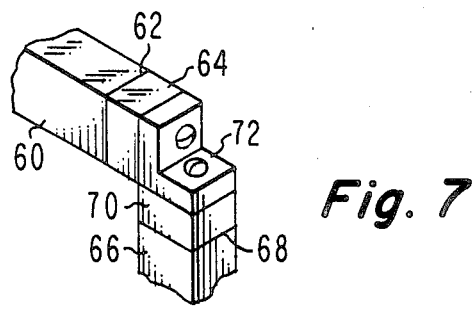
FIG. 7 is an isometric view illustrating a connection joint of the embodiment of FIG. 3.

In FIG. 7 piezoelectric member 60 terminates at end 62, which end is bonded to a joining structure 64. Piezoelectric member 66 end 68 is bonded to a second joining structure 70. An L-shaped bracket 72 is screwed to the joining structures 64 and 70. A device or structure to be displaced by members 60 and 66 may be placed on the L-shaped bracket 72 or secured thereto.

Figure 5:
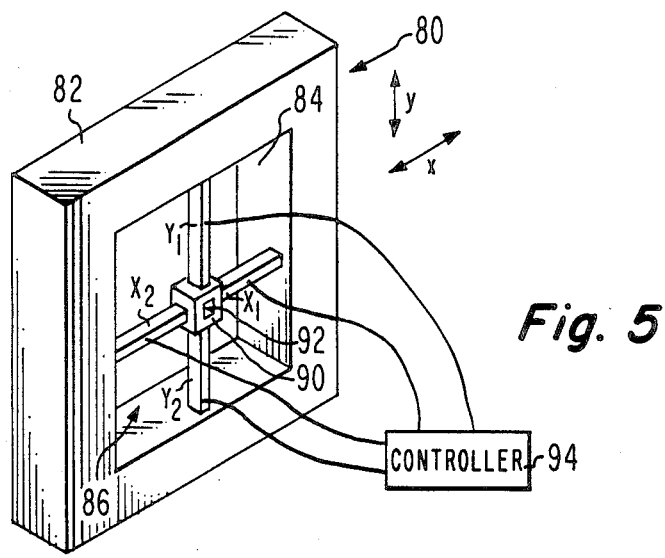
FIG. 5 is an isometric view, partially schematic, of a third embodiment of the present invention.

In FIG. 5, system 80 includes a rectangular ring support 82 having an interior opening 84 in which is piezoelectric positioning device 86. Device 86 comprises two piezoelectric members $X_1$ and $X_2$ aligned on a given axis in the X directions for displacement along that axis. Piezoelectric members $Y_1$ and $Y_2$ are aligned on a second axis in the Y directions normal to the axis of members $X_1$ and $X_2$. One end of each of the members $X_1$, $X_2$, $Y_1$, and $Y_2$ is secured to support 82 at a corresponding interior surface thereof. The cantilevered ends of the members $X_1$, $X_2$, $Y_1$, and $Y_2$ are bonded to a common central joining member 90 having a central aperture 92. System 86 is two-axis and displaces the joining member 90 and its aperture 92 in either the X or the Y directions in accordance with the signals applied to members $X_1$, $X_2$, $Y_1$, and $Y_2$. Because the extended ends of the different piezoelectric members at the central joining member 90 are weak in orthogonal directions as explained above, displacement of the ends of the piezoelectric members along one axis easily displaces the ends of the piezoelectric members aligned in the direction normal to that axis.

A controller 94 applies first control signals simultaneously to the $X_1$ and $X_2$ members and second control signals simultaneously to the $Y_1$ and $Y_2$ members. The signals applied to the $X_1$ and $X_2$ members are identical but of opposite polarity so that the ends of the $X_1$ and $X_2$ members displace simultaneously the same magnitude in the same X direction. Similarly, the signals applied to the $Y_1$ and $Y_2$ piezoelectric members are identical but of opposite polarity so that the extended ends of those members also displace the same magnitude in the same Y direction simultaneously. Thus, when one of the piezoelectric member $X_1$ and $X_2$ elongates in response to applied voltage of a given polarity and magnitude, the other piezoelectric member of $X_1$ and $X_2$ shrinks by the same amount in response to a voltage of opposite polarity but of the same magnitude. Similarly, when one of the $Y_1$ and $Y_2$ members elongates, the other shrinks by the same amount in response to applied voltages. However, in the presence of ambient temperature excursions, piezoelectric members $X_1$, $X_2$, $Y_1$ and $Y_2$ elongate or contract uniformly and, therefore, aperture 92 remains centrally positioned.

Figure 6:
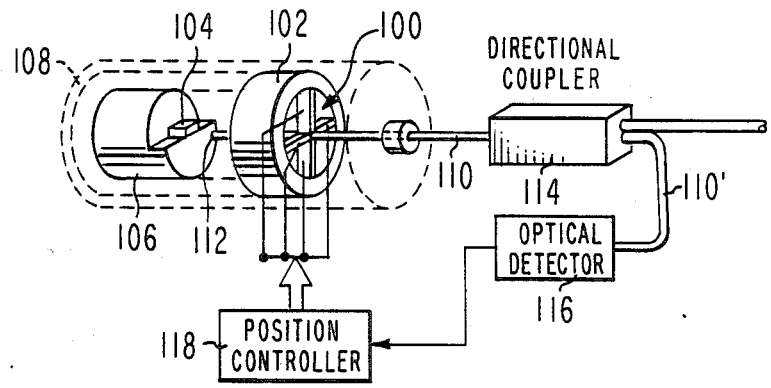
FIG. 6 is an isometric view, partially schematic, of the embodiment of FIG. 5 showing a particular implementation.

In FIG. 6, a piezoelectric system 100, somewhat similar to system 80 of FIG. 5, but, in this case, comprising a support ring 102 of circular configuration, supports a set of X piezoelectric devices and Y piezoelectric devices similar to that illustrated in FIG. 5. A laser diode 104 is secured to a support 106 in a system 108 shown in phantom. An optical fiber 110 passes through the central aperture of the piezoelectric system 100. The fiber is supported by the central joining member corresponding to member 90 of FIG. 5 at aperture 92, FIG. 5. An end 112 of fiber 110 is close to the laser diode 104. A directional coupler 114 is coupled to the optical fiber 110. Coupler 114 transfers some of the signal on fiber 110 to fiber 110'. An optical detector 116 detects the optical signal picked up by the optical fiber 110' from the laser diode 104 via coupler 114 when fiber end 112 is aligned with diode 104. Position controller 118 operates the X and Y axis devices of piezoelectric system 100 to align the fiber 110 with the diode 104 in response to the detected signal received by optical detector 116. The detector 116 output signal to controller 118 indicates alignment of fiber optic end 112 with diode 104.

What is claimed is:

1. A relatively stiff piezoelectric positioning device comprising:
   a first piezoelectric member having first and second opposing ends wherein, in response to an applied first control signal, one of said ends displaces relative to the other end in a given first direction parallel to an axis through said ends;
   a second piezoelectric member having third and fourth opposing ends wherein, in response to an applied second control signal, one of said third and fourth ends displaces relative to the other end in a given second direction parallel to an axis through said third and fourth ends;
   a third piezoelectric member having fifth and sixth ends wherein, one of said fifth and sixth ends displaces in a third direction parallel to an axis through said fifth and sixth ends in response to an applied third control signal;
   means fixedly secure an end of each said member to each other at a common junction; and
   a support for securing the other ends of said members in fixed spaced relation with said first, second, and third directions normal.

2. The device of claim 1 wherein each said members includes a stack of a plurality of piezoelectric elements, each element including means responsive to said applied first and second control signals.

3. The device of claim 1 wherein said means for fixedly securing includes a non-piezoelectric element bonded to each said other ends and fastening means for securing said non-piezoelectric element of each said members to each other.

4. The device of claim 1 further including control means for applying a respective control signal to said first and second members to selectively move said common junction in a selected one of said directions.

5. A piezoelectric positioning device comprising:
   a plurality of piezoelectric members, each having first and second opposing ends;
   a joining member;
   a support;
   each piezoelectric member including means responsive to an applied control signal for displacing one of its ends relative to the other in a given direction parallel to an axis through the ends of that member, one end of each piezoelectric member being secured to said support with said piezoelectric members coplanar, the other end of each piezoelectric member being secured to said joining member centrally relative to said support, said plurality of piezoelectric members being secured in two aligned pairs, the direction of displacement of the displacing ends of each piezoelectric member of an aligned pair being coaxial, the directions of the coaxial aligned displacements of the two pairs being normal; and control means for applying displacement signals to said piezoelectric member so that the ends of an aligned pair of piezoelectric members displace in unison in the same direction parallel to the axis of that pair.

6. The device of claim 5 wherein said joining means includes means for supporting a body whose position is to be controlled.

* * * * *